United States Patent [19]

Cherne et al.

[11] 3,905,904

[45] Sept. 16, 1975

[54] INSTALLATION FOR SEWAGE TREATMENT

[75] Inventors: Lloyd G. Cherne, Edina; Harry Cleveland Grounds, St. Paul; Halvor O. Halvorson, Minneapolis, all of Minn.

[73] Assignee: Cherne Industrial, Inc., Edina, Minn.

[22] Filed: Oct. 1, 1973

[21] Appl. No.: 402,327

[52] U.S. Cl. .................. 210/195; 210/197; 210/202
[51] Int. Cl.² .......................... C02C 1/08; C02B 3/08
[58] Field of Search ............................ 210/4–7, 14, 210/15, 17, 195, 197, 199, 202, 206, 242, 219, 220, 252

[56] References Cited
UNITED STATES PATENTS

| | | | |
|---|---|---|---|
| 3,485,749 | 12/1969 | Reilly | 210/7 |
| 3,505,212 | 4/1970 | Huber | 210/5 |
| 3,549,521 | 12/1970 | Stevens | 210/5 |
| 3,579,439 | 5/1971 | Meiring et al. | 210/5 |
| 3,764,011 | 10/1973 | Owens | 210/197 X |

FOREIGN PATENTS OR APPLICATIONS

| | | | |
|---|---|---|---|
| 1,784,832 | 9/1972 | Germany | 210/6 |

*Primary Examiner*—Samih N. Zaharna
*Assistant Examiner*—Robert H. Spitzer
*Attorney, Agent, or Firm*—Dorsey, Marquart, Windhorst, West & Halladay

[57] ABSTRACT

An installation for sewage treatment utilizing an activated sludge sewage aeration treatment area, such as a sewage treatment channel, which provides a variable volume reservoir in which the volume of sewage under aeration treatment may vary over a substantially broad range, in combination with a sludge settling treatment area. A method of using the installation includes the steps of delivering sewage into the aeration treatment area at variable volume rates which can change from moment to moment during a predetermined daily time period and which generally correspond to the normal variations in volume rates at which the sewage is received from a municipal sewage collection system or other source of sewage to be treated, aerating and circulating the sewage in the aeration treatment area to provide a variable volume of mixed liquor which includes aerated sewage and sludge, with both microorganisms and solids, feeding the mixed liquor from the aeration treatment area to the sludge settling treatment area during such predetermined daily time period at a substantially or nearly constant volume rate at least equal to the average of the variable volume rates at which the sewage is initially delivered to the aeration treatment area during such period, and treating such mixed liquor at such substantially constant volume rate in the sludge settling treatment area, including separating the sludge from the mixed liquor in said area, and discharging the remaining clear liquid effluent from such sludge settling area. The method includes the possible recirculation of at least a portion of the sludge to the aeration treatment area, as well as the possibility of additional treatment of the sludge or the clear liquid effluent, such as chemical treatment of the effluent at a substantially constant volume rate.

6 Claims, 2 Drawing Figures

INSTALLATION FOR SEWAGE TREATMENT

BACKGROUND OF THE INVENTION

Sewage treatment methods and installations are known in which raw or at least partially treated sewage is treated by an activated sludge process, in which a sludge containing microorganisms is combined with the sewage and is treated under suitable conditions, e.g. by suitable aeration equipment to provide the necessary oxygen input for such treatment. In such methods, a mixed liquor is thus formed which includes both suspended solids and microorganisms. After the desired degree of aeration has been achieved, the mixed liquor containing such ingredients is then further processed in one manner or another, for example by removal of selected amounts of the mixed liquor for treatment in settling tanks to settle out the sludge and thus provide a clear effluent for restoration to natural waters with or without further treatment of some kind.

In the carrying out of known methods with previously known installations, the volume rate of treatment in the later sludge settling portions of the treatment process has generally been a function of the volume rates of treatment in the earlier activated sludge aeration stages of the process, with resulting disadvantages in variations and irregularities in the respective treatments which may result from the normal variations from moment to moment in the rate at which a municipal sewage collection system or some other source of sewage actually delivers the initial supply of raw sewage to the treatment plant. This supply may be further variable as a result of infiltration flow from ground and surface waters. Prior efforts to avoid this problem have included the use of large holding or equalization basins ahead of such an activated sludge stage.

SUMMARY OF THE INVENTION

In the method aspects of using the apparatus, the present invention accordingly provides a method of sewage treatment utilizing an activated sludge sewage aeration treatment area, such as a sewage treatment channel which provides a variable volume reservoir wherein the volume of sewage under treatment may vary over a substantially broad range, and a sludge settling treatment area, said method comprising the steps of delivering sewage, which is at most partially treated and may include infiltration flow from ground and surface water, into the activated sludge sewage aeration treatment area at variable volume rates which can change from moment to moment during a predetermined daily time period and which generally correspond to the normal variations in volume rates at which such sewage is received from a source of sewage to be treated, such as a raw sewage collection system, aerating and circulating the sewage in the activated sludge aeration treatment area and thereby providing a variable volume mixed liquor of aerated sewage and sludge including microorganisms and solids for further treatment, feeding mixed liquor from the aeration treatment area to the sludge settling treatment area during such predetermined daily time period at a substantially constant volume rate at least equal to the average of the variable volume rates at which the sewage is initially delivered to the aeration treatment area during such period, and treating such mixed liquor at such substantially constant volume rate in the sludge treatment area, including separating the sludge from the mixed liquor in said sludge treatment area, and discharging the remaining clear liquid effluent from the sludge settling area.

In its apparatus or installation aspects, the present invention providies a variable volume reservoir capacity for the initial sewage aeration treatment channel in which the volume of sewage under treatment may vary from a maximum volume determined by the total capacity of the area to a minimum volume as little as half of that capacity. Conversely, the variation may be from a minimum reservoir capacity which accommodates the normal expected differential volume between the volume rate of input and the volume rate of treatment in the subsequent sludge settling treatment area, to a maximum volume of as much as twice such minimum volume or more. In combination with such a substantially variable volume treatment channel, the installation includes means for controlling the volume rate of flow of mixed liquor from the aeration treatment area to the sludge settling treatment area. Such a control device may involve a constant volume pump, the volume rate of operation of which may be adjusted for the particular optimum conditions of treatment in the sludge settling treatment area. Such a flow control means can also take the form of a known control valve, which can be controlled to deliver a constant volume rate regardless of variations in the depth and therefore the pressure or head within the sewage aeration treatment channel. Other flow control devices such as floating weirs which remove a constant volume rate of flow from the surface of the liquid in the aeration treatment area, regardless of variations in the height of such surface, can also be used. The installation preferably includes means preventing such constant rate feeding device from feeding mixed liquor out of the sewage treatment channel whenever the depth of liquid in the channel is below a desired minimum operating level. An overflow means or bypass can deliver excess mixed liquor at a higher volume rate whenever the depth exceeds a desired maximum.

Other details and advantages of the invention, in its apparatus or installation aspects will be apparent from the following description.

BRIEF DESCRIPTION OF THE DRAWING

In the drawings, which form a part of this invention, and in which like reference characters indicate like parts.

DESCRIPTION OF THE PREFERRED EMBODIMENT

Figure 1:
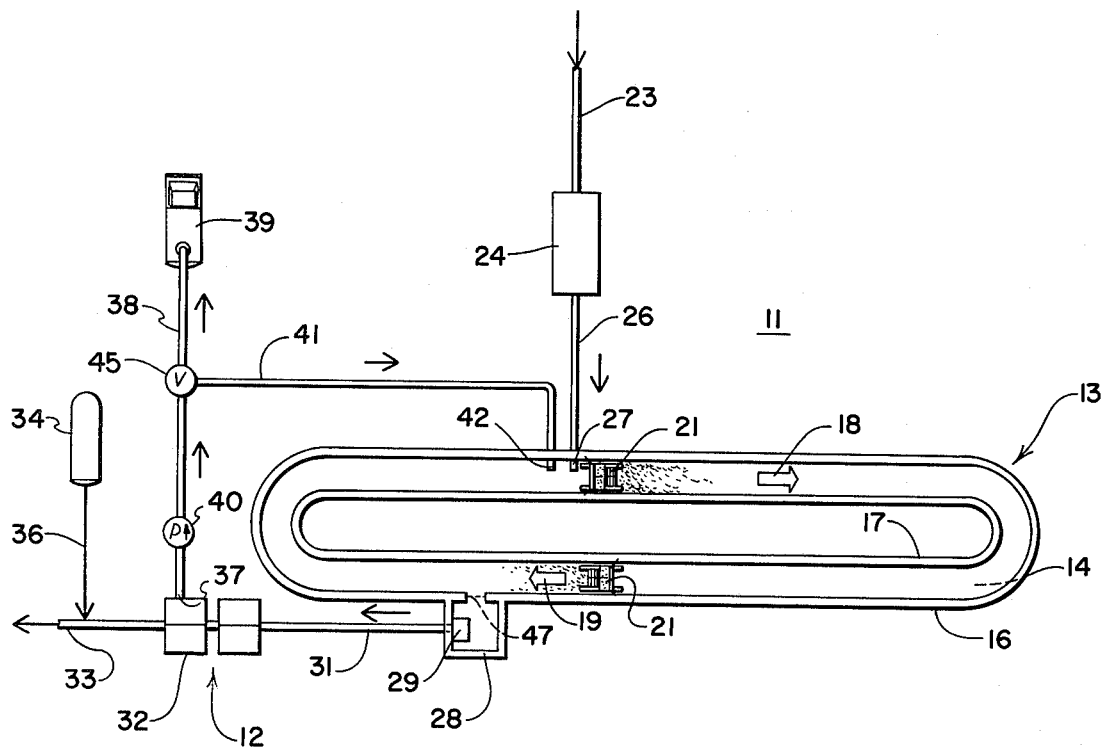
FIG. 1 is a plan of a sewage treatment installation according to the invention.

As shown in FIG. 1, a sewage treatment installation includes an activated sludge sewage treatment area 11, and a sludge settling treatment area 12. The aeration treatment area is shown in the form of a sewage treatment channel 13 having a bottom 14 and upwardly and outwardly extending sides 16 and 17. The channel of FIG. 1 follows a continuous circular path, in which sewage to be treated can be circulated in the direction shown by arrows 18 and 19, at a desired linear rate of flow adapted to prevent, in known manner, the undesired settling out of solids in the channel. The desired flow rate, as well as the aeration of the so-called mixed liquor in such a sewage treatment channel is achieved in this case by one or more aeration rotors 21. Such aeration rotors may take the form shown in U.S. Pat. No. 3,759,495, issued to the same assignee as the present invention, or other known devices may be used to maintain the desired rate of flow and to achieve the desired aeration of the mixed liquor. When desired, the aerating devices may be separate from the rotors or other devices which maintain the desired rate of flow in the channel.

The raw sewage to be treated is initially received through the incoming delivery line 23 of a sewage collection installation, such as a municipal sewage collection system. Such sewage may then be passed through a preliminary treatment unit 24 in which coarse screening is used to remove foreign objects, and in which larger particles of sewage solids may be reduced to a more desirable particle size for subsequent treatment. From such a preliminary treatment unit, the sewage then passes through conduit 26 to a sewage delivery inlet 27 in the sewage treatment area 11. As shown in FIG. 1, this delivery point can be upstream of the aeration and mixing unit 21, so that the incoming raw or partially treated sewage will be initially mixed with the rest of the mixed liquor which is already in the channel and which includes both activated sludge and sewage previously introduced, i.e. a combination of suspended solids and appropriate microorganisms which provide the desired sewage treatment in response to appropriate oxygen input in this aeration treatment area.

As further shown in FIG. 1, an outlet area 28 substantially downstream from inlet 27 is connected by suitable flow control means 29 and conduit 31 to deliver mixed liquor from the aeration treatment channel to the sludge settling treatment area 12, in which one or more settling tanks 32 of known construction are provided to permit settling out of the sludge from the remaining clear liquid effluent. The effluent can ultimately be discharged through an outlet channel at 33 for restoration to a natural water source or for other appropriate use. Before the clear effluent is discharged at 33, it may also be subjected to appropriate chemical treatment from a chemical supply source 34 through appropriate connections 36.

The sludge which is settled out through settling tanks 32 in the settling treatment area 12 may be removed at 37 and selectively delivered in desired fashion through an outlet 38 for removal by a truck 39 or other suitable removal device, or a selected portion of such sludge may be recirculated through a connection 41 to an outlet 42 through which the desired portion is recycled or recirculated to the sewage aeration treatment channel 13. Pump 40 and valve 45 provide such selective sludge handling.

Also, if desired, further chemical or other treatment of the sludge may be provided in known manner.

In order to insure the desired operation of the aeration treatment area 11, the control outlet area 28 is provided with an overflow edge 47 or other device, which establishes a minimum volume in the treatment channel 13, below which the flow control unit 29 and conduit 31 will not be able to deliver further mixed liquor from the channel 13. In this manner, a sufficient minimum volume is maintained in the channel 13 to insure proper operation of the activated sludge process and treatment of the raw sewage received and retained by the channel. When the liquid in the treatment area 11 is above this minimum level established at 47, then the flow control arrangements at 28 and 29 will deliver a nearly constant rate of flow of mixed liquor to the sludge settling treatment area 12. Thus, the treatment area 12 can be ordinarily operated at all times at a substantially constant rate to minimize the attention required by personnel in supervision of such operation.

Figure 2:
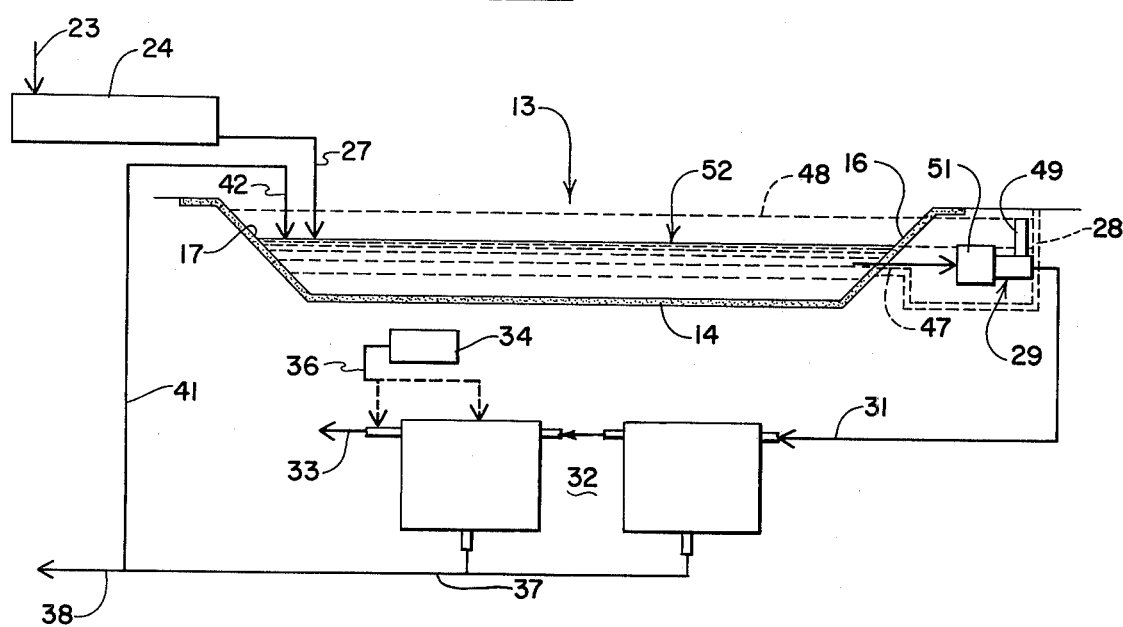
FIG. 2 is a partially schematic sectional flow diagram showing details of the sewage treatment process of the present invention.

As shown schematically in FIG. 2, the activated sludge aeration treatment channel 13 can accommodate a variable volume between the minimum volume established by the overflow level at 47, and a maximum volume shown by the line 48, which represents, in effect, the point at which the treatment channel would overflow. To prevent the channel from overflowing into the adjacent land area, however, the flow control mechanism 29 in area 28 is provided with an overflow outlet 49, which will deliver any such excess volume, above the maximum volume of the treatment channel, to the sludge settling treatment area 12. Thus, at least some treatment of this overflow liquid can be achieved, even if it is not at the optimum volume rate for which the device 29 ordinarily is set. The flow control device 29 may consist of any type of device or apparatus adapted to provide a controllable substantially uniform volume rate of flow from the treatment channel 13, regardless of variations in the operating level of the liquid in that channel between the minimum level at 47 and the maximum level at 48. Thus, an adjustable constant volume pump mechanism of known construction may be used at 29, or the inlet portion of the control device, as shown at 51, may conceivably involve a floating weir of known construction which delivers mixed liquor at a constant head or level below the operating surface 52 of the liquid at any given moment.

It will be understood that both the constant volume rate control device for delivering mixed liquor from treatment area 11 to treatment area 12, and the configuration of the sewage treatment channel or reservoir 13, as well as other elements of the installation, are capable of substantial variation, provided only that the treatment area 11 includes a sewage treatment channel or reservoir 13 of sufficient total capacity to function as a variable volume reservoir and accommodate most of the expected moment-to-moment variations in incoming flow of sewage to be treated, while at the same time the flow control mechanism 29 delivers a nearly constant volume rate of flow to the sludge settling treatment area 12 for operation at a nearly constant rate which will provide the optimum desired efficiency for the total installation. The selection of specific capacities for both the treatment channel 13, and the sludge settling treatment area 12 will depend on the particular sewage generating installation to be served, such as the size of a municipality or industrial plant for which such a plant is designed. Also, instead of the straight inclined or tapered walls 16 and 17 of the sewage treatment channel, other cross-sectional shapes can be used. For example, the relative relationship illustrated in FIG. 2, in which the total volume increase for a given increase in depth near the top of the channel exceeds the volume for a corresponding depth near the bottom of the channel can be enhanced by further narrowing the channel bottom 14, and by a more gradual slope or even an irregular configuration for the sidewalls 16 and 17.

In summary, an and installation for sewage treatment has been disclosed in which an activated sludge aeration treatment channel can serve as a variable volume raw or partially treated sewage receiving reservoir and can accommodate wide differences in the momentary volume rates of incoming sewage to be treated, and in which the mixed liquor from such an aeration treatment channel can then be fed at a nearly constant volume rate to a sludge settling or further treatment area, in which the desired further treatment can be carried out at an optimum volume rate on a relatively steady-state basis. The invention thus eliminates the need for large separate preliminary holding or equalization basins. Thus, according to the foregoing specification, the nature and background of this invention have been set forth, and some of the ways of practicing the invention have been described, including the preferred embodiment presently contemplated as the best mode of carrying out the invention.

We claim:

1. A sewage treatment installation comprising an open-topped activated sludge sewage aeration treatment channel having a bottom and sides forming an endless closed loop path which provides a variable volume activated sludge treatment reservoir for containing and treating a mixed liquor of sewage and activated sludge including microorganisms and suspended solids, a delivery device for delivering sewage, which is at most partially treated, into the activated sludge treatment channel at one location along the path at variable volume rates which can change from moment to moment during a predetermined daily time period and which generally correspond to the normal variations in volume rates at which such sewage is received from a source of sewage to be treated, such as a raw sewage collection system, a device for continuously circulating the sewage with activated sludge as mixed liquor in one direction around the closed loop path in the activated sludge treatment channel at a linear rate of flow preventing undesired settling out of suspended solids in the channel, at least one sludge settling tank for receiving mixed liquor and separating it into sludge and remaining clear liquid effluent, and a substantially constant rate feeding device for feeding mixed liquor from a second location along the path in the activated sludge treatment channel to such sludge settling tank during such predetermined daily time period at a substantially constant volume rate at least equal to the average of the variable volume rates at which the sewage is initially delivered by the delivery device to the activated sludge treatment reservoir during such period, said installation including means for aerating the mixed liquor in the aeration treatment channel and overflow means for feeding mixed liquor from the treatment channel to the sludge settling tank at a higher rate than said substantially constant volume rate whenever the depth of the liquor in said channel exceeds a predetermined maximum level to prevent the channel from overflowing into any adjacent land area.

2. A sewage treatment installation according to claim 1 in which the device for circulating the sewage includes at least one device located at the surface of liquid in the channel and having a construction causing the relative movement of the mixed liquor in said one direction and also constituting at least part of the means for aerating the mixed liquor, said one circulating device being located along said path downstream from said delivery device and upstream from said feeding device.

3. A sewage treatment installation according to claim 2 including means normally preventing the constant rate feeding device from feeding mixed liquor out of the channel whenever the depth of the liquor in said channel is lower than a predetermined minimum level.

4. A sewage treatment installation according to claim 1 in which the overflow means comprises a high volume rate overflow conduit which effective bypasses the constant rate feeding device.

5. A sewage treatment installation according to claim 1 in which the channel side walls have a cross-sectional shape providing a greater volume increase in the channel for a given increase in liquid depth near the top of the channel than for a corresponding increase in liquid depth near the bottom of the channel.

6. A sewage treatment installation according to claim 1 wherein said at least one sludge settling tank comprises a first sludge settling tank for receiving mixed liquor from said channel and separating it into sludge and relatively clear liquid effluent and a second sludge settling tank for receiving said relatively clear liquid effluent from said first sludge settling tank and further separating it into sludge and said remaining clear liquid effluent.

* * * * *